US012769277B2

(12) United States Patent
Mazur et al.

(10) Patent No.: US 12,769,277 B2
(45) Date of Patent: Oct. 20, 2026

(54) HUMAN INTERFACE MODULE (HIM) CONNECTIVITY AND INTERFACE FOR CONTEXTUALIZED HEALTH STATISTICS IN AN INDUSTRIAL AUTOMATION ENVIRONMENT

(71) Applicant: Rockwell Automation Technologies, Inc., Mayfield Heights, OH (US)

(72) Inventors: David C. Mazur, Mequon, WI (US); Marius G. Chis, Cambridge (CA); Ryan Coon, Franklin, WI (US); Scott D. Day, Richfield, WI (US); Lukasz Gornikowski, Cracow (PL); Roberto S. Marques, Mequon, WI (US); Jonathan A. Mills, Mayfield Heights, OH (US); Nathaniel S. Sandler, Cleveland, OH (US); Kurt D. Sneen, Park City, UT (US); Patryk Woszczyna, Cracow (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 526 days.

(21) Appl. No.: 18/460,324

(22) Filed: Sep. 1, 2023

(65) Prior Publication Data

US 2025/0076842 A1 Mar. 6, 2025

(51) Int. Cl.
*G05B 19/406* (2006.01)

(52) U.S. Cl.
CPC .. *G05B 19/406* (2013.01); *G05B 2219/31368* (2013.01)

(58) Field of Classification Search
CPC .................... G05B 19/406; G05B 2219/31368
See application file for complete search history.

(56) References Cited

U.S. PATENT DOCUMENTS

| | | | | |
|---|---|---|---|---|
| 11,016,468 | B1 * | 5/2021 | Barker | G07C 3/08 |
| 2003/0063900 | A1 | 4/2003 | Wang | |
| 2010/0082158 | A1 | 4/2010 | Lakomiak | |
| 2011/0173496 | A1 | 7/2011 | Hosek | |
| 2016/0155098 | A1 | 6/2016 | McElhinney | |
| 2016/0299496 | A1 * | 10/2016 | Reichard | G05B 19/042 |
| 2018/0082568 | A1 | 3/2018 | Pamulaparthy | |
| 2019/0101910 | A1 | 4/2019 | Schleiss | |
| 2019/0384255 | A1 | 12/2019 | Krishnaswamy | |
| 2020/0104184 | A1 | 4/2020 | Subramanian | |

(Continued)

OTHER PUBLICATIONS

Non-Final Office Action mailed by the USPTO on Jan. 13, 2026 in U.S. Appl. No. 18/460,234, 18 pages.

(Continued)

*Primary Examiner* — Zhipeng Wang

(57) ABSTRACT

The present technology relates to health metrics corresponding to industrial automation devices and a user experience for connecting to devices in an industrial automation environment to configure and view health metrics. Health metrics of a device can be obtained from a server, an industrial device, a controller coupled to the industrial device, or another source, and provided to a user interface device. The user interface device can display indications of the health metrics on a user interface. The user interface device can also establish a connection with a user device and provide the indications of the health metrics to the user device for display on a user interface of the user device.

20 Claims, 11 Drawing Sheets

(56) References Cited

U.S. PATENT DOCUMENTS

| | | | | |
|---|---|---|---|---|
| 2021/0287458 | A1 | 9/2021 | Kyes | |
| 2021/0341896 | A1* | 11/2021 | Miklosovic | G06N 20/00 |
| 2021/0341901 | A1* | 11/2021 | Miklosovic | G05B 19/406 |
| 2021/0356926 | A1* | 11/2021 | Singh | G05B 19/0428 |
| 2021/0390474 | A1 | 12/2021 | Ranjan | |
| 2022/0187798 | A1 | 6/2022 | Azamfar | |
| 2024/0031306 | A1 | 1/2024 | Lal | |
| 2024/0094718 | A1* | 3/2024 | SayyarRodsari | G05B 19/042 |
| 2026/0043711 | A1* | 2/2026 | Singh | G01M 13/045 |

OTHER PUBLICATIONS

Non-Final Office Action mailed by the USPTO on Mar. 18, 2026 in U.S. Appl. No. 18/460,295, 12 pages.

* cited by examiner

HUMAN INTERFACE MODULE (HIM) CONNECTIVITY AND INTERFACE FOR CONTEXTUALIZED HEALTH STATISTICS IN AN INDUSTRIAL AUTOMATION ENVIRONMENT

RELATED APPLICATIONS

This application is related to co-pending U.S. patent application Ser. No. 18/460,234, titled "MOBILE APPLICATION AND USER-EXPERIENCE WITH CONTEXTUALIZED HEALTH STATISTICS FOR INDUSTRIAL AUTOMATION DEVICES," filed concurrently, and co-pending U.S. patent application Ser. No. 18/460,295, titled "EDGE DEVICE SUPPORT OF COMPUTATION OF CONTEXTUALIZED HEALTH STATISTICS IN AN INDUSTRIAL AUTOMATION ENVIRONMENT," filed concurrently, the contents of which are incorporated by reference in their entireties for all purposes.

TECHNICAL FIELD

Various embodiments of the present technology relate to industrial automation devices and particularly to health statistics associated with industrial automation devices.

BACKGROUND

Industrial automation environments, such as factories, mills, and the like, employ various devices like sensors and actuators (e.g., drives), machinery, and other components to perform industrial processes. Controllers and processors can automate various industrial systems and associated processes. For example, a controller connected to an industrial system can direct devices to perform functions in an integrated manner that, together, produce results. It is important to ensure that each device in the industrial system is working properly otherwise the industrial system as a whole may be at risk of failure.

Various solutions exist today to monitor industrial system performance and device performance. For example, sensors can be used to track outputs of devices in an industrial system. By way of another example, controllers connected to an industrial system may obtain data output by devices in the industrial system. Such solutions can generate copious amounts of data to perform trend analyses and monitor systems, among other features. However, the data generated by these solutions is not always helpful to end-users. Often times, such data is confined to what the vendor of the solution defines or to limitations of the sensors and actuators of a system. It may be cumbersome or even impossible to re-define or re-program sensors, actuators, or monitoring solutions. Thus, these solutions can fail to use raw data originating from an industrial system or devices to generate insights into the data based on end-user requirements at run-time of an industrial system.

Additionally, such data offered by conventional solutions may only be accessed by dedicated devices running the solutions. Thus, it may be difficult for shopfloor technicians, for example, to easily detect issues with machinery and equipment when walking through an industrial environment as dedicated computers for viewing device data may not be accessible from any location in an environment.

SUMMARY

Systems, devices, and methods are provided herein for producing health metrics associated with industrial automation devices and instantiating the health metrics on a user interface to visualize health information about the industrial automation devices. An industrial or commercial environment may include various industrial automation devices, such as variable-speed drives, motors, belts, and the like, which perform industrial automation processes. More particularly, a variable-speed drive may be coupled to various other devices and control an industrial automation process via the other devices. A variable-speed drive may receive signals from connected devices indicative of performance of the devices (also referred to as performance metrics). Such performance metrics can be contextualized and used with rule sets to analyze the health of the variable-speed drive and connected devices. The health information related to the devices can be provided to a user interface device coupled to the devices for viewing visual and textual indications of performance, health, and conditions of the devices. The health information can further be provided from the user interface device to a user device with a user interface to allow for navigation by a user to configure and view the performance, health, and conditions of the devices.

In an embodiment of the present technology, a system for obtaining health information associated with industrial automation devices and providing the health information to a user interface device coupled to the industrial automation devices is provided. The system includes a controller coupled to an industrial device and a user interface device coupled to the controller. The controller has controller processors and a controller memory coupled to the controller processors. The controller memory has controller program instructions stored on the controller memory that, based on being read and executed by the controller processors, direct the controller processors to perform various functions. For example, the controller program instructions may direct the controller processors to obtain device health metrics and device health metrics categories associated with the industrial device. The device health metrics include contextualized performance metrics associated with the industrial device, and the device health metrics categories include categorizations of a health of the industrial device based on one or more of the device health metrics. The user interface device includes a user interface, device processors, and device memory coupled to the device processors. The device memory has device program instructions that, based on being read and executed by the device processors, direct the device processors to perform various functions. For example, the device program instructions may direct the device processors to receive the device health metrics and device health metrics categories from the controller and display, via the user interface, first indications corresponding to the device health metrics and second indications corresponding to the device health metrics categories.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
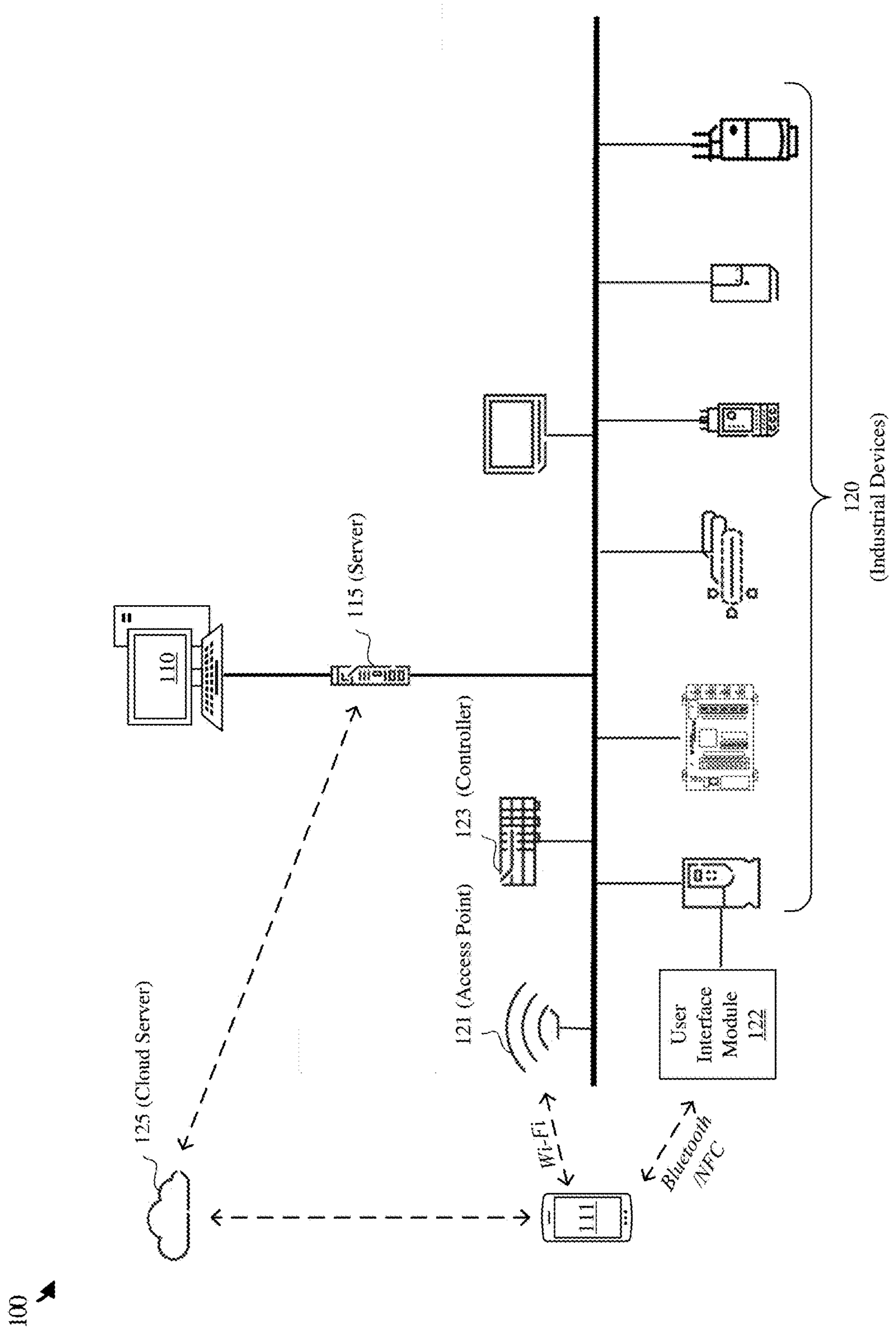
FIG. 1 illustrates an example operating environment in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology relate to health metrics corresponding to devices in an industrial automation environment, and more particularly, to a user experience for configuring, customizing, requesting, and viewing the health metrics. In industrial and commercial environments, various devices, such as drives, motors, relays, sensors, and the like along with the driven machinery, such as conveyors, pumps, fans, and more, which can be used to perform industrial, manufacturing, and commercial processes. Several processes involving such devices can be automated through the use of processors and controllers coupled to devices. However, data gathered from the devices during run-time operations of industrial processes is often unhelpful and limited. For example, controllers coupled to devices may have limited interfaces that only show a few metrics or signals coming from a connected device. The signals obtained from these controllers may only indicate performance data at a given time on such interfaces. In conventional solutions, vast amounts of data are often gathered and run through complex software to understand if the way in which the devices are being operated is appropriate or sustainable without issues. However, customization and contextualization of data based on end-user needs is not offered or requires re-programming from software engineers trained on the solutions.

To address these issues, a system can gather performance metrics from various industrial devices, analyze the health and condition of the devices, and inform unhealthy behavior based on the performance metrics. Further, the system can provide indications of the health, condition, and performance not only on navigable dashboards of a user interface of a user device but also on a user interface of a user interface device coupled directly to one or more industrial devices for a user to view information (e.g., metrics, statistics) about the industrial devices, view visual indications related to health of the connected industrial devices, and take actionable measures to alleviate current risks or prevent future risks in the industrial environment. The outputs of the system can be generated based on end-user configurations and customizations through a user experience that also displays the outputs.

In an embodiment of the present technology, a system for obtaining health information associated with industrial automation devices and providing the health information to a user interface device coupled to the industrial automation devices is provided. The system includes a controller coupled to an industrial device and a user interface device coupled to the controller. The controller has controller processors and a controller memory coupled to the controller processors. The controller memory has controller program instructions stored on the controller memory that, based on being read and executed by the controller processors, direct the controller processors to perform various functions. For example, the controller program instructions may direct the controller processors to obtain device health metrics and device health metrics categories associated with the industrial device. The device health metrics include contextualized performance metrics associated with the industrial device, and the device health metrics categories include categorizations of a health of the industrial device based on one or more of the device health metrics. The user interface device includes a user interface, device processors, and device memory coupled to the device processors. The device memory has device program instructions that, based on being read and executed by the device processors, direct the device processors to perform various functions. For example, the device program instructions may direct the device processors to receive the device health metrics and device health metrics categories from the controller and display, via the user interface, first indications corresponding to the device health metrics and second indications corresponding to the device health metrics categories.

In another embodiment, a system for obtaining health information associated with industrial automation devices, connecting to a user device, and providing the health information to the user device is provided. The system includes a controller coupled to an industrial device and a user interface device coupled to the controller. The controller has controller processors and a controller memory coupled to the controller processors. The controller memory has controller program instructions stored on the controller memory that, based on being read and executed by the controller processors, direct the controller processors to perform various functions. For example, the controller program instructions may direct the controller processors to obtain device health metrics and device health metrics categories associated with the industrial device. The device health metrics include contextualized performance metrics associated with the industrial device, and the device health metrics categories include categorizations of a health of the industrial device based on one or more of the device health metrics. The user interface device includes a communication interface, device processors, and device memory coupled to the device processors. The device memory has device program instructions that, based on being read and executed by the device processors, direct the device processors to perform various functions. For example, the device program instructions may direct the device processors to receive a request to establish a wireless connection to a user device, establish, via the communication interface, the wireless connection with the user device based on the request, and provide, via the wireless connection, first indications corresponding to the device health metrics and second indications corresponding to the device health metrics categories to the user device.

In yet another embodiment, a user interface device for obtaining health information associated with industrial automation devices is provided. The user interface device includes a user interface, one or more device processors, and a device memory. The device memory has device program instructions that, based on being read and executed by the device processors, direct the device processors to perform various functions. For example, the device program instructions may direct the device processors to obtain device health metrics and device health metrics categories from a controller and display, via the user interface, first indications corresponding to the device health metrics and second indications corresponding to the device health metrics categories.

Advantageously, the disclosed system can produce device health information from raw data obtained from industrial devices and provide a user experience with visualizations of the device health information, such as predictive and preventative maintenance tasks, threshold-related comparisons, and other risks posed by run-time performance of the industrial devices, which can provide meaningful insight to users in a user interface of a user device. Not only may this equip a user with insightful metrics related to performance and health of an industrial device, but also this may reduce overhead for purchasing and operating complex software programs pre-configured to analyze specific measurements and risks associated with an industrial automation system. Additionally, visual indications providable by user interface devices can allow users walking through an industrial automation environment to quickly view statuses of industrial devices without the need for analysis on metrics obtained from connected industrial devices. Accordingly, reducing the use and need for complex software programs and program or user analysis may reduce processing and memory requirements for computing systems. Additionally, such a user experience can also allow a user to re-define or configure customized device health information and visualizations of device health information as necessary without requiring the expertise of a software engineer. This can further reduce processing and memory requirements as operations and logic for performing device health processes can be simplified and distributed to one or more processing systems available in an industrial automation environment, such as devices themselves, controllers of the devices, user interface devices coupled to devices and controllers, and one or more different servers.

Turning now to the Figures, FIG. 1 illustrates an example operating environment 100 demonstrating industrial, commercial, and automation elements. Operating environment 100 includes user device 110, user device 111, server 115, industrial devices 120, access point 121, and cloud server 125. In various examples, server 115 may be configured to perform device health processes and provide device health metrics to a user interface of a user device, such as user devices 110 and 111.

Operating environment 100 is representative of an environment in which industrial and commercial processes can occur, and in which a user may operate a user device (e.g., user device 110, user device 111) to view device health information (i.e., metrics, statistics, parameters, and characteristics related to health, performance, and condition) of industrial devices 120 used in performing industrial and commercial processes.

User device 110 is an example of a computing device operable in operating environment 100. User device 110 may include a screen and one or more peripheral devices to operate user device 110. User device 110 can display an instance of a device health application on the screen, which may include one or more dashboards having status indicators, behavior indicators, preventative or predictive maintenance indicators, and the like, related to industrial devices 120. User device 110 may download and run the device health application, or user device 110 may surface the device health application via a web-based browser. The one or more peripherals, such as a mouse, for example, can be used to navigate and interact with the device health application on a user interface displayed on the screen of user device 110. For example, a user can navigate the device health application to view various device health metrics related to industrial devices 120. Furthermore, the user can use the device health application to configure device health metrics to customize the device health metrics as needed based on the operation of industrial devices 120. Operating environment 100 may include any number of user devices 110.

Server 115 is an example of one or more servers, processors, or other computing devices operating in operating environment 100. In some examples, server 115 may be an edge server located on the premises of an industrial automation environment. In other examples, server 115 may be located remotely from the industrial automation environment (i.e., a cloud-based server). Server 115 may include hardware, software, and firmware, or any combination or variation thereof, to perform device health processes. Server 115 may obtain data from industrial devices 120, controller 123, or one or more of human interface module 122 coupled to industrial devices 120 via a wired connection at an industrial facility or via a wireless connection such as by using a communication network. Server 115 may further communicate with cloud server 125 via a wired or wireless communication network.

Industrial devices 120 include various types of industrial and commercial devices that may be used to perform respective processes in operating environment 100. For example, industrial devices 120 may include one or more of variable-speed drives, motors, circuit devices, relays, sensors, and more. Various components of industrial devices 120 may be coupled together via wired or wireless connections, such as through access point 121. As industrial devices 120 perform respective processes, industrial devices 120 can produce signals and measurements indicative of performance. A variable-speed drive may produce various signals from a motor connected to it. By way of example, the variable-speed drive may provide signals indicative of a motor voltage, a motor temperature, or a motor speed, among other signals. Such signals can be obtained by server 115 or user device 111.

In other examples, controller 123, coupled to one or more of industrial devices 120, may obtain the signals and measurements indicative of performance of industrial devices 120 and provide the signals and measurements to other components. Controller 123 is representative of a controller or control module, such as a PLC or an analytic option card, associated with a device in operating environment 100. In some examples, controller 123 may be externally coupled with one or more of industrial devices 120 and can control functionality of the devices. In other examples, controller 123 may be installed in one or more industrial devices 120 and can provide device health analytics control and monitoring.

User interface module 122 may be representative of a user interface device that can be coupled to one or more of industrial devices 120 to display information about the performance and health of industrial devices 120. User interface module 122 may be associated with a single device. User interface module 122 may, however, be associated with multiple devices. Regardless, controller 123 and/or user interface module 122 may control operations of respective industrial devices 120 and provide data to server 115 or user device 111 based on the performance of the respective industrial devices 120.

Access point 121 is representative of a wireless network connection point for connecting one or more devices to a communication network in the industrial automation environment. In various examples, one or more of industrial devices 120 may be connected to access point 121. Server 115 may also be connected to the same communication network that access point 121 provides access to. Thus, server 115 may obtain data associated with industrial devices 120 via a communication network accessible through access point 121.

Access point 121 can also provide a wireless connection point for user device 111 to connect to the communication network and to obtain data from industrial devices 120 or server 115. User device 111 is representative of a handheld mobile device, such as a smart phone or tablet, which can connect to devices in operating environment 100 via wireless connections. For example, user device 111 can connect to access point 121 via a Wi-Fi connection. User device 111 may, alternatively or additionally, connect to industrial devices 120 via user interface module 122 of industrial devices 120. In various examples, user device 111 can connect to user interface module 122 via a Bluetooth connection or via a near field communication (NFC) protocol. In such examples, user device 111 may be located in close proximity to user interface module 122, industrial devices 120, and access point 121 to interface with such components.

User device 111 may also be connected to cloud server 125 via the same communication network provided by access point 121 or a different communication network. Cloud server 125 is representative of a cloud-based environment in which at least some other operations for device health processes may be performed. In various examples, cloud server 125 may include one or more servers, processors, databases, datacenters, and the like capable of receiving performance metrics and device health metrics from server 115 or user device 111. Cloud server 125 may obtain data from server 115 and user device 111, perform device health processes on the data, and provide device health metrics, or indications of the device health metrics, to server 115 and user device 111 for instantiation on a user interface of user devices 110 and 111.

Like user device 110, user device 111 may also include a user interface for displaying an instance of a device health application. User device 111 may download the device health application from an application store or access the instance of the device health application from a browser. The instance displayed on user device 111 may include one or more navigable dashboards having status indicators, behavior indicators, preventative or predictive maintenance indicators, and the like, related to industrial devices 120. Similarly, a user of user device 111 can navigate the device health application displayed on user device 111 to view, configure, and customize device health metrics associated with industrial devices 120. In some examples, the instance of the device health application operable on user device 111 may differ from the instance of the device health application operable on user device 110. For example, dashboards available for navigation on user device 110 may differ in size and information relative to dashboards available for navigation on user device 111. Regardless, the indications and information displayed on user device 110 may be obtained from server 115, cloud server 125, controller 123, user interface module 122 of industrial devices 120, or industrial devices 120 via a communication network.

In operation, a user may request device health metrics associated with one or more industrial devices 120 via user device 110 or user device 111. From user device 110, the request can be provided to server 115. Server 115 can identify the request and the respective industrial device based on the request. Server 115 can obtain performance metrics from the industrial device, from controller 123, or from user interface module 122 of the industrial device. Then, server 115 can perform operations on the performance metrics to contextualize the performance metrics based on contextualization information specific to the performance metrics and produce device health metrics. Contextualization information may include information indicative of a type of value (e.g., voltage, temperature, current) of the performance metrics. By way of example, for a request seeking information about health of a motor in the industrial automation environment, a performance metric related to motor speed may be obtained. Contextualization of the motor speed may include identifying the type of performance metric (e.g., device output metric or value, predictive metric, preventative metric) and the unit of measurement of the performance metric (e.g., rotations per minute (RPM)) and converting the value of the performance metric to a percentage. Thus, the contextualized performance metric, or device health metric, may indicate at what percentage of capable motor speed the motor is running (e.g., 85%).

Server 115 may also apply one or more rule sets to the device health metrics to produce device health metrics categories, including a healthy category, an unhealthy category, and an approaching unhealthy category, among other categories. The rule sets may include threshold values, time windows or time ranges, or other defined rules. Following the previous example using percentage of motor speed, the request may seek information corresponding to the health of the device when operating with such performance. A first rule set can be applied to determine the duration that the motor has been running at the motor speed. A second rule set can further be applied to determine whether the motor has been running beyond a threshold value for a threshold duration. As a result of applying the rule sets, server 115 can determine whether the motor is operating in a healthy state, an unhealthy state, or an approaching unhealthy state. Server 115 can provide both the device health metrics and the device health metrics categories to user device 110 for instantiation on the user interface of user device 110.

From user device 111, the request for device health metrics can be provided to cloud server 125, server 115 (via access point 121), or industrial devices 120 (either directly or via controller 123 or user interface module 122). Cloud server 125 and industrial devices 120 may provide the request to server 115 to perform operations on the performance metrics as described above. However, in some cases, cloud server 125 or industrial devices 120 may perform at least a subset of the operations on the performance metrics instead of or in addition to providing the request to server 115 to perform operations on the performance metrics. In either case, the contextualization and rule sets may be performed on the performance metrics to produce device health metrics and device health metrics categories, respectively, based on the request. Server 115 or cloud server 125 can then provide the device health metrics and device health metric categories to the user interface of user device 111.

In various examples, cloud server 125 and server 115 may store performance metrics gathered from industrial devices 120 based on requests in one or more databases. Thus, previously stored performance metrics can be used to provide historical health metrics, trend analysis, predictive maintenance metrics, and the like to user devices 110 or 111 based on requests.

Figure 2:
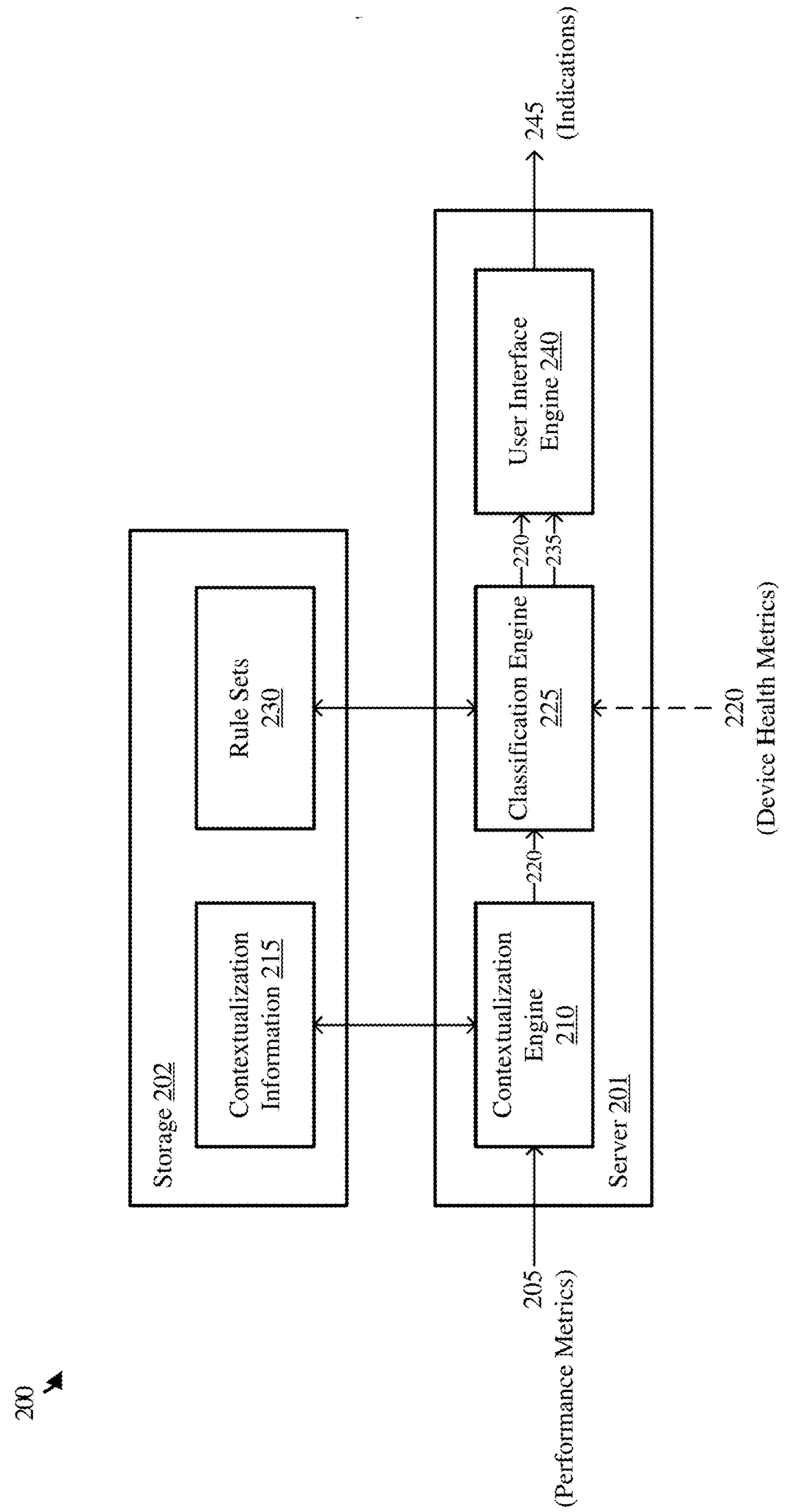
FIG. 2 illustrates an example block diagram of a memory and a server capable of producing device health metrics in accordance with some embodiments of the present technology.

FIG. 2 illustrates an example block diagram 200 including a server 201 and a storage 202 capable of producing device health information in accordance with some embodiments of the present technology. Server 201 includes contextualization engine 210, classification engine 225, and user interface engine 240. Storage 202 includes contextualization information 215 and rule sets 230. In various examples, server 201 and associated components may represent server 115 of FIG. 1.

Server 201 is representative of one or more servers, processors, or other computing devices capable of performing device health processes on performance metrics 205 and producing indications 245 for visualization on a user interface of a user device. In some examples, server 201 may be an edge server that is located on the premises of an industrial or commercial environment. Alternatively, server 201 may be located remotely from an industrial environment. Server 201 may include hardware, software, and firmware components, or any combination or variation thereof, to perform such operations. Examples of such components may include contextualization engine 210, classification engine 225, and user interface engine 240.

Performance metrics 205 are provided to server 201 from one or more industrial devices operating in an industrial automation environment (e.g., operating environment 100 of FIG. 1). Performance metrics 205 may include signals and measurements indicative of performance of the industrial devices. For example, performance metrics 205 may include voltage measurements, motor speed, device temperature, and the like of one or more industrial devices. Contextualization engine 210 of server 201 can receive performance metrics 205 either directly from the industrial devices or from a controller associated with the industrial devices (e.g., a PLC). In some examples, contextualization engine 210 may alternatively obtain performance metrics 205 from a database that stores performance metrics 205.

Contextualization engine 210 is representative of any processor or processing unit capable of contextualizing performance metrics 205 from industrial devices in an industrial automation environment and producing device health metrics 220. Examples of such processor(s) may include microcontrollers, DSPs, general purpose central processing units, application specific processors or circuits (e.g., ASICs), and logic devices (e.g., FPGAs), as well as any other type of processing device, combinations, or variations thereof.

Contextualization of performance metrics 205 refers to providing context to performance metrics 205 to make performance metrics 205 more useful and insightful to a user reading performance metrics 205. For example, contextualizing performance metrics may include re-formatting performance metrics 205 to a different type of data or adding additional data or indications to performance metrics 205. In various examples, contextualizing performance metrics 205 includes performing one or more operations on performance metrics 205 using contextualization information 215 from storage 202. Such operations may include re-formatting operations, mathematical operations, and filtering operations.

Storage 202 is representative of one or more databases capable of being read from and written to by server 201 and associated components. Storage 202 may include volatile and nonvolatile, removable and non-removable media elements implemented in any method of technology for storage of information, such as contextualization information 215 and rule sets 230. Storage 202 is shown as a single component but may be implemented as one or more storage devices and may include devices for storing software and firmware. As such, storage 202 may be implemented separately or in an integrated manner with respect to other types of storage. Storage 202 is not a transitory signal in any embodiment.

Contextualization information 215 includes information for the contextualization of performance metrics 205 specific to a type of performance metric. For example, contextualization information 215 may include information indicative of a type of a value (e.g., voltage, temperature, current, speed) or unit of measurement of a value (e.g., volts, degrees Fahrenheit, amps, RPM). By way of example, performance metrics 205 may be related to motor speed. Contextualization information 215 may include information indicating that performance metrics 205 includes a speed and a unit of measurement of the speed. Contextualization engine 210 can use performance metrics 205 and contextualization information 215 to contextualize performance metrics 205, such as by performing an operation to convert the value of performance metrics 205 from RPM to a percentage of total capable motor speed (e.g., 85%). The contextualized performance metric may be referred to as device health metrics 220, which can be provided to classification engine 225.

Device health metrics 220, or a subset of device health metrics 220, may instead or additionally be obtained from a different source than contextualization engine 210. For example, device health metrics 220 may be determined and provided by a user device, a cloud-based server, the industrial device, a controller associated with the industrial device, or a combination thereof, such as components other than server 115 in operating environment 100 of FIG. 1.

Classification engine 225 is also representative of any processor or processing unit. In various examples, classification engine 225 and contextualization engine 210 may be embodied in a single processor. However, in other examples, classification engine 225 and contextualization engine 210 may operate independently with respect to one another.

Classification engine 225 receives device health metrics 220 from contextualization engine 210 and obtains rule sets 230 from storage 202. Classification engine 225 can apply rule sets 230 to device health metrics 220 to produce device health metrics categories 235 indicative of a health and condition of the industrial device.

Rule sets 230 may include threshold values, time windows or time ranges, or other defined rules specific to device health metrics 220. In some cases, rule sets 230 may be user-defined, pre-configured rules and threshold values based on the industrial device and performance metrics 205 obtainable from the industrial device, among other factors. Following the previous example using percentage of motor speed, a user may seek information corresponding to the health of the industrial device (e.g., motor) when operating under such conditions. A first rule set can be applied to determine the duration that the motor has been running at the motor speed. A second rule set can also be applied to determine whether the motor has been running beyond a threshold value for a threshold duration. As a result of applying rule sets 230, classification engine 225 can determine whether the motor is operating in a healthy state, an unhealthy state, or an approaching unhealthy state. Accordingly, device health metrics categories 235 may indicate a health status, such as healthy, unhealthy, or approaching unhealthy. However, other status indicators may be contemplated. Classification engine 225 can provide device health metrics categories 235 to user interface engine 240.

User interface engine 240 is also representative of any processor or processing unit. User interface engine 240 may function as an independent processor with respect to contextualization engine 210 and classification engine 225, but in some examples, user interface engine 240 may also function in an integrated manner with respect to contextualization engine 210 and classification engine 225. User interface engine 240 can obtain device health metrics 220 and device health metrics categories 235 from classification engine 225 and produce indications 245 from device health metrics 220 and device health metrics categories 235.

Indications 245 include representations of the data of device health metrics 220 and device health metrics categories 235 for display on a user interface of a user device. For example, indications 245 may include color indicators, such as green, yellow, and red, based on device health metrics categories, such as healthy, approaching unhealthy, and unhealthy, respectively. Indications 245 may also include values, units of measurement, and names corresponding to device health metrics 220 and device health metrics categories 235 for display on the user interface. User interface engine 240 can provide indications 245 to a user device (e.g., a computing device, a smart phone, a tablet), such as user devices 110 or 111 of FIG. 1.

Figure 3:
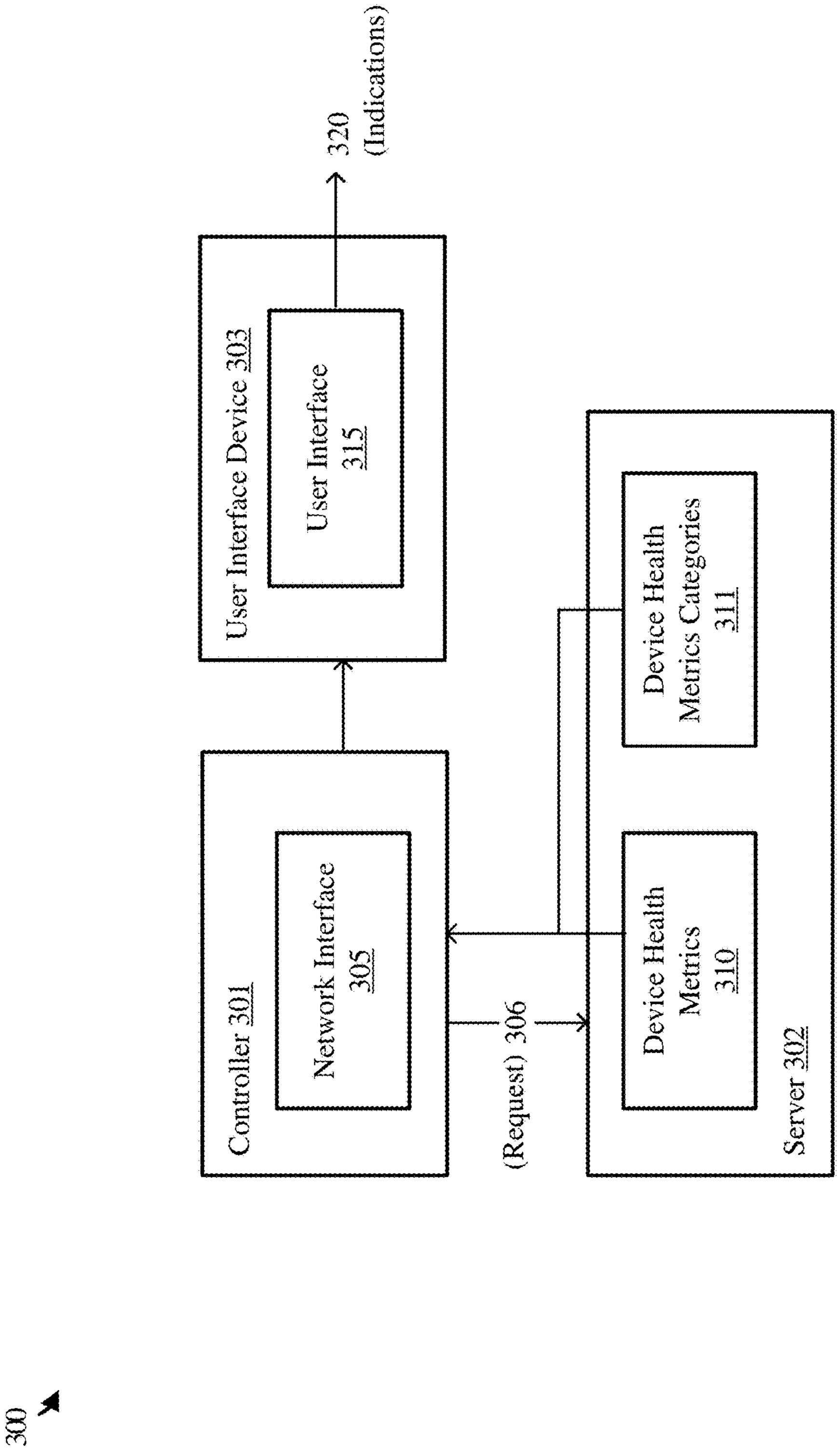
FIG. 3 illustrates an example block diagram of components of an industrial automation environment capable of producing indications of device health metrics in accordance with some embodiments of the present technology.

FIG. 3 illustrates an example block diagram 300 of components of an industrial automation environment capable of producing indications of device health metrics in accordance with some embodiments of the present technology. Block diagram 300 includes controller 301, server 302, and user interface device 303. Controller 301 includes network interface 305. Server 302 includes device health metrics 310 and device health metrics categories 311. User interface device 303 includes user interface 315. In various examples, controller 301 may represent controller 123 of FIG. 1, and server 302 may represent server 115 of FIG. 1 or server 201 of FIG. 2.

Controller 301 is representative of a controller or control module, such as a PLC, associated with one or more industrial devices operating in an industrial automation environment. For example, controller 301 may include one or more processors and a memory with program instructions stored on the memory to control industrial devices. Controller 301 may be associated with a single industrial device. Controller 301 may, however, be associated with multiple industrial devices. Regardless, controller 301 may control operations of respective industrial devices and obtain data from respective industrial devices, such as performance metrics.

Controller 301 may include network interface 305. Network interface 305 is representative of an interface capable of providing access to a communication network for controller 301 to obtain device health metrics 310 and device health metrics categories 311. For example, network interface 305 may allow controller 301 to communicate with server 302 to obtain such data. Using network interface 305, controller 301 may provide request 306 to server 302 to obtain device health metrics 310 and device health metrics categories 311.

Server 302 is an example of one or more servers, processors, or other computing devices operating in an industrial automation environment. In some examples, server 302 may be an edge server located on the premises of an industrial automation environment. In other examples, server 302 may be located remotely from the industrial automation environment (i.e., a cloud-based server). Server 302 may include hardware, software, and firmware, or any combination or variation thereof, to perform device health processes. For example, server 302 may include one or more processors and a memory with program instructions stored on the memory capable of being executed by the one or more processors. When the processors of server 302 execute the program instructions, the program instructions may direct the processors to obtain device health metrics 310 and device health metrics categories 311.

Device health metrics 310 may include contextualized performance metrics indicative of performance of an associated industrial device. Performance metrics may include statistics and metrics obtained from the industrial device. The performance metrics may be contextualized by performing operations on the performance metrics to provide additional insight to the statistics gathered from the industrial device. By way of example, performance metrics may be related to motor speed of a motor. Contextualizing these performance metrics may include performing an operation to convert the value of the performance metrics from RPM to a percentage of total capable motor speed (e.g., 85%). The contextualized performance metrics may be referred to as device health metrics 310.

Device health metrics categories 311 may include categorizations of a health of the associated industrial device. The categorizations of device health metrics categories 311 may include a healthy category, an unhealthy category, and an approaching healthy category. To determine the categorizations, one or more rule sets may be applied to device health metrics 310. In some cases, rule sets may be user-defined, pre-configured rules and threshold values based on the industrial device and performance metrics obtainable from the industrial device, among other factors. Following the previous example using percentage of motor speed, a user may seek information corresponding to the health of the industrial device (e.g., motor) when operating under such conditions. A first rule set can be applied to determine the duration that the motor has been running at the motor speed. A second rule set can also be applied to determine whether the motor has been running beyond a threshold value for a threshold duration. As a result of applying the rule sets, device health metrics categories 311 can be identified indicating whether the motor is operating in a healthy state, an unhealthy state, or an approaching unhealthy state.

In some examples, server 302 may produce device health metrics 310 and device health metrics categories 311. However, in other examples, server 302 may obtain device health metrics 310 and device health metrics categories 311 from another source, such as controller 301, the industrial device (s), or another server. In such examples where controller 301 produces device health metrics 310 and device health metrics categories 311, server 302 may not be needed. Rather, controller 301 may obtain performance metrics from an industrial device and use the performance metrics to determine device health metrics 310 and device health metrics categories 311. To produce device health metrics 310, server 302 may obtain performance metrics associated with the industrial device and contextualize the performance metrics. To produce device health metrics categories 311, server 302 may classify or categorize the contextualized performance metrics, or device health metrics 310, into categories indicative of health of the industrial device (e.g., healthy, unhealthy). Server 302 can then provide device health metrics 310 and device health metrics categories 311 to controller 301 based on request 306.

Controller 301 can provide device health metrics 310 and device health metrics categories 311 to user interface device 303. User interface device 303 is representative of a device coupled to one or more industrial devices that can display indications 320 associated with device health metrics 310 and device health metrics categories 311 on user interface 315 for a user to identify performance, health, and condition of a respective industrial device. For example, user interface device 303 may include a human-interface module (HIM) connected, wirelessly or via a wired connection, to one or more industrial devices. User interface 315 of user interface device 303 includes a display and text including information about device health metrics 310 and device health metrics categories 311 (i.e., indications 320).

Indications 320 include representations of the data of device health metrics 310 and device health metrics categories 311 for display on user interface 315. For example, indications 320 may include color indicators, such as green, yellow, and red, based on device health metrics categories, such as healthy, approaching unhealthy, and unhealthy, respectively. Indications 245 may also include values, units of measurement, and names corresponding to device health metrics 310 and device health metrics categories 311 for display on user interface 315. Although not shown, user interface device 303 may further include a communication interface to provide indications 320 to a user device (not shown) (e.g., user device 110 or 111 of FIG. 1) for display of indications 320 on a user interface of the user device.

Figure 4:
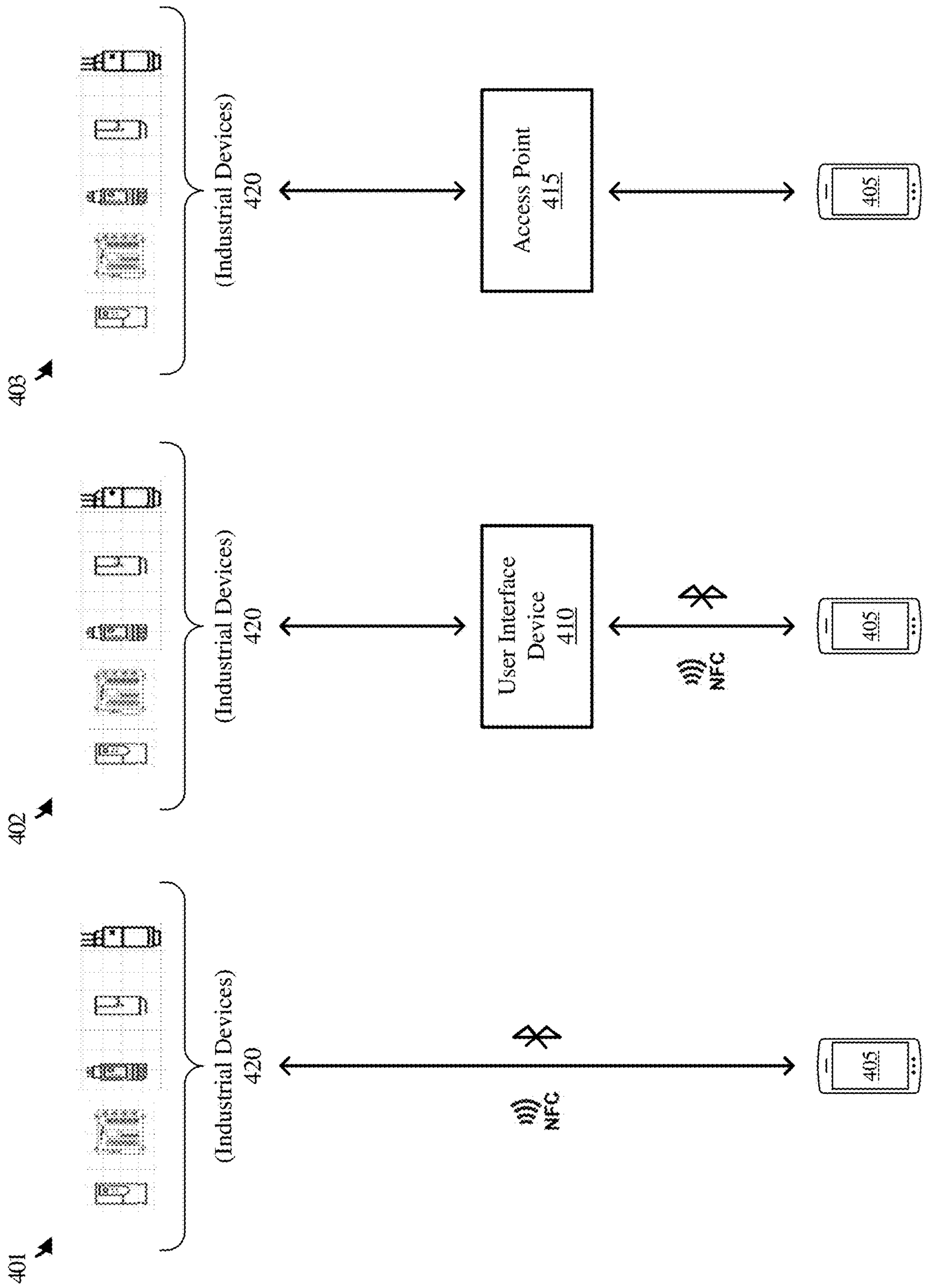
FIG. 4 illustrates example aspects of interconnectivity between a user device and industrial devices in an industrial automation environment in accordance with some embodiments of the present technology.

FIG. 4 illustrates example aspects of interconnectivity between a user device and industrial devices in an industrial automation environment in accordance with some embodiments of the present technology. FIG. 4 includes aspects 401, 402, and 403. Aspect 401 includes user device 405 and industrial devices 420. Aspect 402 includes user device 405, user interface device 410, and industrial devices 420. Aspect 403 includes user device 405, access point 415, and industrial devices 420. In various examples, user device 405 may represent user device 111 of FIG. 1, user interface device 410 may represent user interface device 303 of FIG. 3, access point 415 may represent access point 121 of FIG. 1, and industrial devices 420 may represent industrial devices 120 of FIG. 1.

In aspects 401, 402, and 403, user device 405 attempts to establish a wireless connection to industrial devices 420 to obtain data of industrial devices 420 and determine health, performance, and condition of industrial devices 420 based on the data. User device 405 is representative of a handheld mobile device, such as a smart phone or tablet, which can connect to industrial devices 420 via a wired or wireless connection. User device 405 may include a user interface for displaying an instance of a device health application. User device 405 may download the device health application from an application store or access the instance of the device health application from a browser. The instance displayed on user device 405 may include one or more navigable dashboards having status indicators, behavior indicators, preventative or predictive maintenance indicators, and the like, related to industrial devices 420.

Industrial devices 420 are representative of various types of industrial and commercial devices that may be used to perform respective processes in an industrial, commercial, or industrial automation environment. For example, industrial devices 420 may include one or more of variable-speed drives, motors, circuit devices, programmable logic controllers (PLCs), relays, sensors, and more. Various components of industrial devices 420 may be coupled together via wired or wireless connections. As industrial devices 420 perform respective processes, industrial devices 420 can produce signals and measurements indicative of performance. By way of example, a variable-speed drive may produce various signals indicative of a voltage of a connected device, a temperature of a connected device, or a motor speed of a connected device, among other signals. Such signals can be used by a server, controller, or user device (e.g., user device 405) to analyze health and performance of industrial devices 420.

Referring first to aspect 401, user device 405 may establish a connection with industrial devices 420 directly using a near-field communication (NFC) protocol or using Bluetooth. In an example using NFC, user device 405 may be placed in close proximity to industrial devices 420 to establish a wireless connection. In an example using Bluetooth, user device 405 may also be located in close proximity to industrial devices 420, within a range acceptable under Bluetooth protocols, to establish the wireless connection. In either scenario, once connected, user device 405 can obtain performance metrics from industrial devices 420 and perform device health processes to produce indications of health and performance for display on user device 405.

In aspect 402, user device 405 may establish a connection with user interface device 410, which may be connected to industrial devices 420. User interface device 410 is representative of a device coupled to one or more of industrial devices 420, either wirelessly or via a wired connection, which can display indications associated with performance metrics of industrial devices 420. Accordingly, user interface device 410 may include a user interface to display indications of performance, health, and condition of industrial devices 420, however, user interface device 410 may not run an instance of a device health application like user device 405. User interface device 410 may also include a communication interface to allow for connection to user device 405.

In an example, user device 405 can establish a connection with user interface device 410 via an NFC protocol. In another example, user device 405 can establish a connection with user interface device 410 via Bluetooth. In either example, user device 405 can obtain data, like performance metrics, from user interface device 410 as opposed to receiving the data directly from industrial devices 420 as in aspect 401.

In aspect 403, user device 405 may establish a connection with industrial devices 420 via access point 415. Access point 415 is representative of a wireless network connection point for connecting one or more devices to a communication network in an industrial automation environment (i.e., via Wi-Fi). In various examples, one or more of industrial devices 420 may be connected to a communication network via access point 415. Accordingly, user device 405 can connect to the communication network accessible via access point 415 for user device 405 to obtain data from industrial devices 420. For example, user device 405 can connect to the communication network via access point 415 by using a Wi-Fi connection. User device 405 can then obtain performance metrics from industrial devices 420 through the wireless connection.

Figure 5:
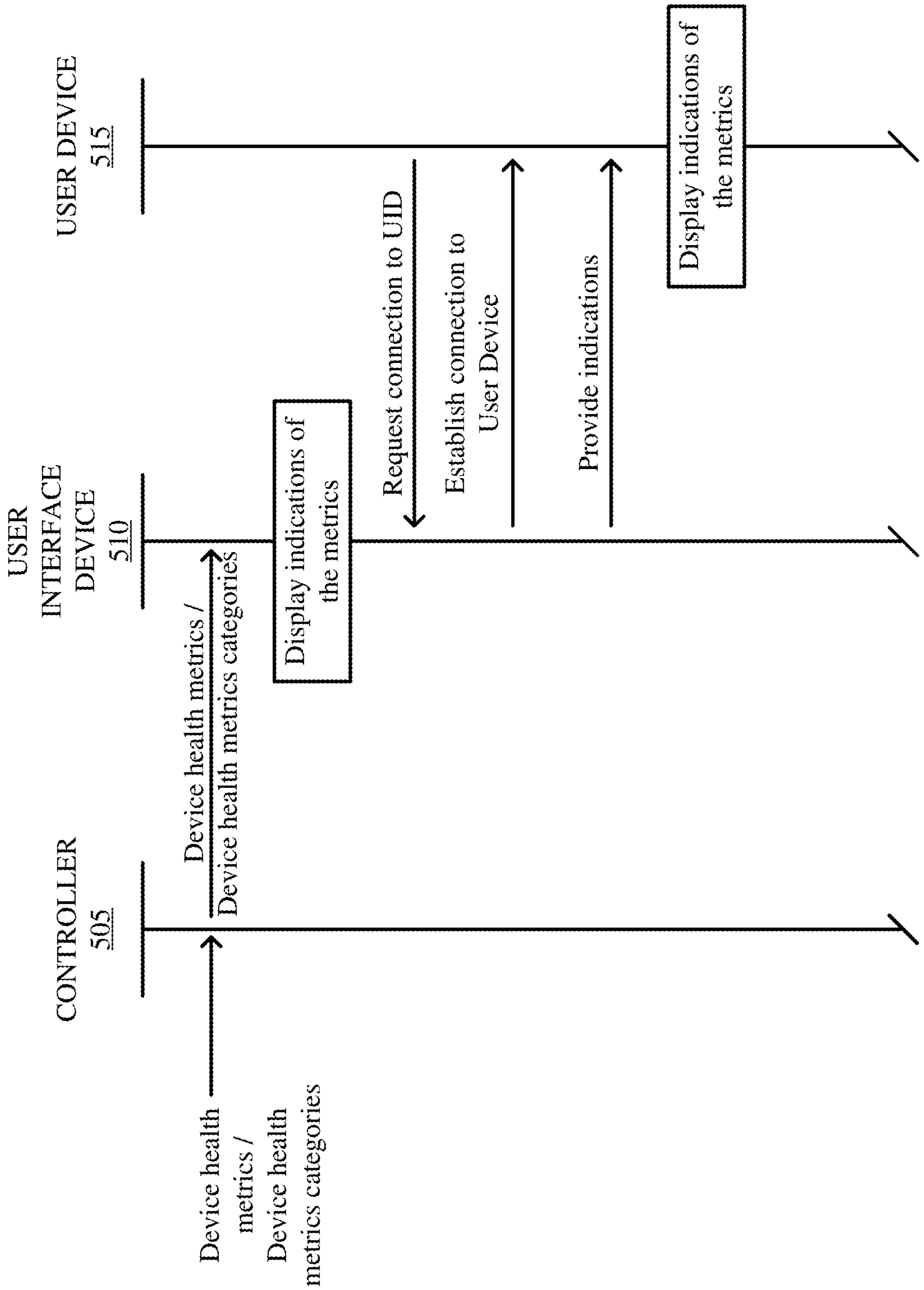
FIG. 5 illustrates a sequence diagram for connecting devices and displaying indications of device health metrics on devices in accordance with some embodiments of the present technology.

FIG. 5 illustrates a sequence diagram for connecting devices and displaying indications of device health metrics on devices in accordance with some embodiments of the present technology. FIG. 5 includes controller 505, user interface device 510, and user device 515. Controller 505 may be representative of controller 301 of FIG. 3, user interface device 510 may be representative of user interface device 303 of FIG. 3, and user device 515 may be representative of user device 111 of FIG. 1 or user device 405 of FIG. 4.

In the sequence diagram illustrated in FIG. 5, controller 505 may first obtain device health metrics and device health metrics categories. The device health metrics may include contextualized performance metrics indicative of performance of an associated industrial device. Performance metrics may include statistics and metrics obtained from the industrial device. The performance metrics may be contextualized by performing operations on the performance metrics to provide additional insight to the statistics gathered from the industrial device. By way of example, performance metrics may be related to motor speed of a motor. Contextualizing these performance metrics may include performing an operation to convert the value of the performance metrics from RPM to a percentage of total capable motor speed (e.g., 85%). The device health metrics categories may include categorizations of the health of the associated industrial device. The categorizations may include a healthy category, an unhealthy category, and an approaching healthy category. To determine the categorizations, one or more rule sets may be applied to the device health metrics. In some cases, rule sets may be user-defined, pre-configured rules and threshold values based on the industrial device and performance metrics obtainable from the industrial device, among other factors. Following the previous example using percentage of motor speed, a user may seek information corresponding to the health of the industrial device (e.g., motor) when operating under such conditions. A first rule set can be applied to determine the duration that the motor has been running at the motor speed. A second rule set can also be applied to determine whether the motor has been running beyond a threshold value for a threshold duration. As a result of applying the rule sets, device health metrics categories can be identified indicating whether the motor is operating in a healthy state, an unhealthy state, or an approaching unhealthy state.

In some examples, controller 505 may obtain device health metrics and device health metrics categories from a server (not shown), such as server 302 of FIG. 3. However, in other examples, controller 505 may produce the device health metrics and device health metrics categories. Controller 505 can then provide the device health metrics and device health metrics categories to user interface device 510.

User interface device 510 is representative of a device coupled to one or more industrial devices that can display indications associated with the device health metrics and the device health metrics categories on a user interface to display information related to performance, health, and condition of a respective industrial device. For example, user interface device 510 may be representative of user interface device 303 of FIG. 3. User interface device 510 may be coupled, wirelessly or via a wired connection, to one or more industrial devices and one or more user devices, such as user device 515. User interface device 510 includes a display and text including information about the device health metrics and device health metrics categories.

User device 515 is representative of a handheld mobile device, such as a smart phone or tablet, which can connect to industrial devices and user interface device 510 via a wireless connection. User device 515 may include a user interface for displaying an instance of a device health application. User device 515 may download the device health application from an application store or access the instance of the device health application from a browser. The instance displayed on user device 515 may include one or more navigable dashboards having status indicators, behavior indicators, preventative or predictive maintenance indicators, and the like, related to respective industrial devices.

To connect to user interface device 510 and receive indications of the device health metrics and device health metrics categories, user device 515 can provide a request for connection to user interface device 510. User interface device 510 can establish a connection to user device 515 via a wired or wireless connection protocol, such as Bluetooth, NFC, or Wi-Fi. To establish the connection, user interface device 510 may include a communication interface capable of interfacing with user device 515 over a communication network and using one or more networking protocols. In various examples, user device 515 and user interface device 510 may be located in close proximity, relative to one another, to establish the wireless connection.

After the wireless connection is established, user interface device 510 can provide indications of the device health metrics and device health metrics categories to user device 515. The indications may include representations of the data of the device health metrics and the device health metrics categories for display on a user interface of user device 515. For example, the indications may include color indicators, such as green, yellow, and red, based on device health metrics categories, such as healthy, approaching unhealthy, and unhealthy, respectively. The indications may also include values, units of measurement, and names corresponding to the device health metrics and the device health metrics categories for display on the user interface. Accordingly, user device 515 can then display the indications of the device health metrics and device health metrics categories as a user navigates the device health application using the user interface of user device 515.

Figure 6A:
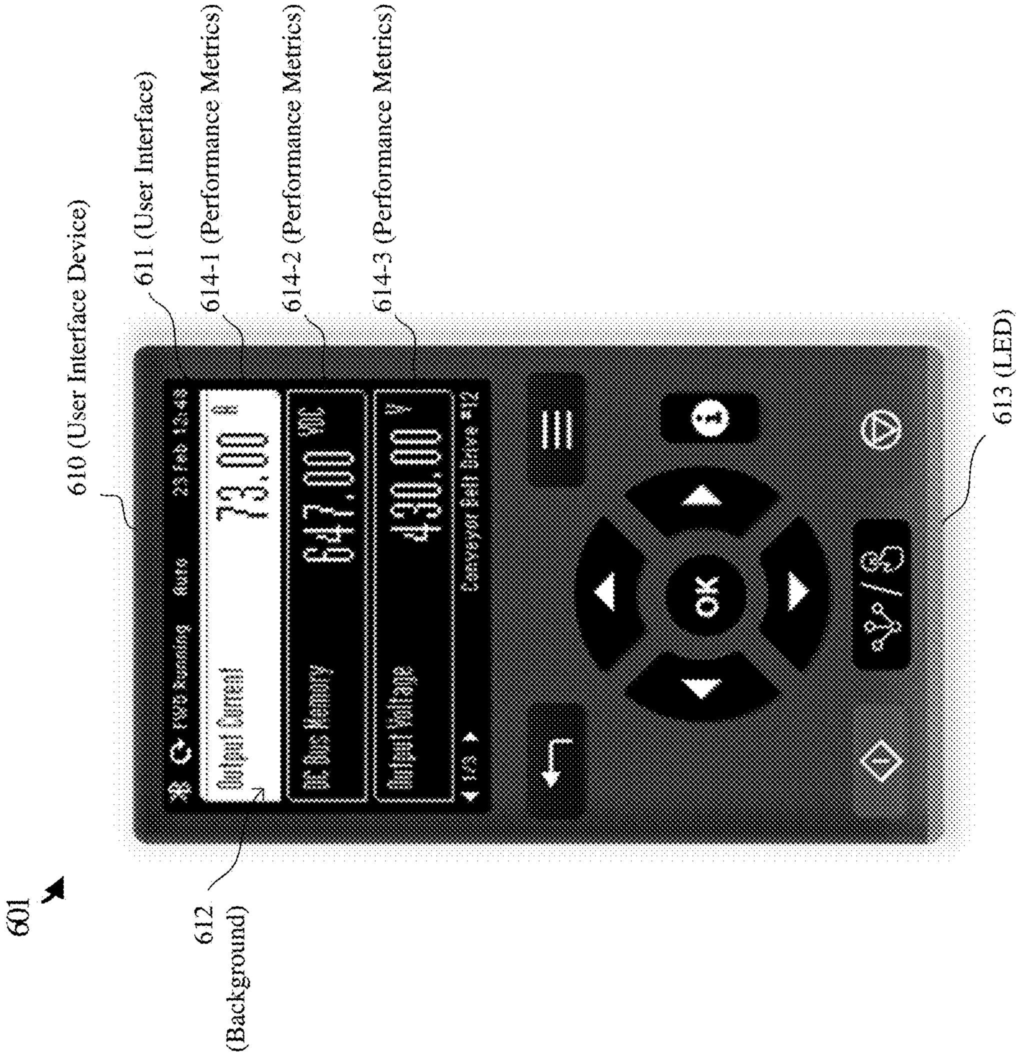
FIGS. 6A and 6B illustrate example representations of user interface devices in accordance with some embodiments of the present technology.
Figure 6B:
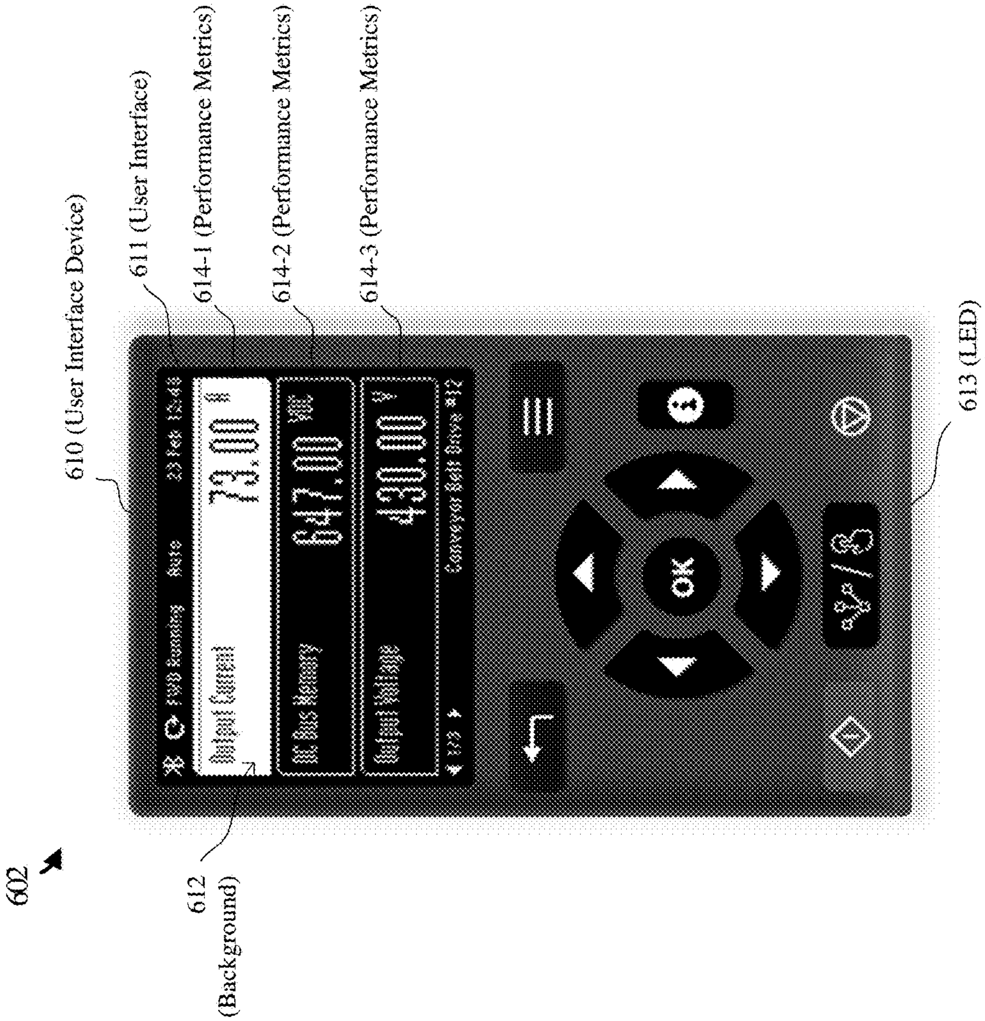

FIGS. 6A and 6B illustrate example representations of user interface devices in accordance with some embodiments of the present technology. FIGS. 6A and 6B include user interface device 610 and demonstrate aspects that may cause light-emitting diode (LED) 613 of user interface device 610 to change colors based on the health metrics and indicate health of an industrial device coupled to user interface device 610 (not shown). User interface device 610 may represent user interface device 410 of FIG. 4, or any other user interface device discussed.

Referring first to FIG. 6A, FIG. 6A includes aspect 601, which illustrates user interface device 610 and a user interface 611 of user interface device 610 that can display performance metrics 614-1, 614-2, and 614-3 (also collectively referred to as performance metrics 614) associated with a connected industrial device (not shown).

User interface device 610 is representative of a device coupled to one or more industrial devices that can display indications related to health, performance, and condition of a respective industrial device(s) on user interface 611. User interface device 610 may be coupled, wirelessly or via a wired connection, to one or more industrial devices operating in an industrial automation environment, and may obtain, via the connection, performance metrics 614 from the coupled industrial devices.

Performance metrics 614-1, 614-2, and 614-3 may be representative of data, statistics, measurements, and metrics corresponding to coupled industrial devices. For example, the industrial devices may produce signals indicative of performance when operating in the industrial automation environment. Accordingly, user interface device 610 can produce performance metrics 614-1, 614-2, and 614-3 from the signals of the industrial devices and display the metrics on user interface 611. For example, performance metrics 614-1 may include metrics related to output current of a conveyer belt drive. The output current may be displayed on user interface 611 as 73.00 Amps. Performance metrics 614-2 may include metrics related to DC Bus voltage of the conveyer belt drive. The DC Bus voltage may be 647.00 Volts. Performance metrics 614-3 may include metrics related to output voltage of the conveyer belt drive. The output voltage may be 430.00 Volts. In some cases, user interface device 610 may display performance metrics in real-time (i.e., as the industrial device(s) operate and produce signals), however, in other cases, user interface device 610 may display performance metrics following completion of an operation.

User interface 611 may include background 612 that has a default contrast with respect to text displayed on user interface 611. In various examples, the default contrast between background 612 and the text may include a black background with white text. As illustrated in aspect 601, user interface device 610 can display performance metrics 614-2 and 614-3 on user interface 611 using the default contrast scheme. User interface device 610 may display performance metrics 614-1 using an inverted contrast relative to the default contrast. The inverted contrast may include background 612 having a white color and text having a white font. In various examples, user interface device 610 can invert the contrast between background 612 and the text displayed on user interface 611 based on performance metrics 614-1, 614-2, and 614-3. More specifically, user interface device 610 can determine if performance metrics 614-1, 614-2, or 614-3 include metrics indicative of healthy, unhealthy, or approaching unhealthy behavior. In aspect 601, user interface device 610 may determine that performance metrics 614-1 are indicative of unhealthy behavior of the conveyer belt drive, so user interface device 610 can invert the contrast of the portion of background 612 associated with performance metrics 614-1.

Additionally, user interface device 610 may include LED 613, which may emit two or more colors based on the health of an associated industrial device. In various examples, LED 613 may emit a green light when the associated industrial device is operating according to normal, or healthy, operating parameters, a yellow light when the associated industrial device is operating according to sub-optimal, or approaching unhealthy, operating parameters, and a red light when the associated industrial device is operating according to poor, or unhealthy, operating parameters.

To determine a contrast of background 612 on user interface 611 and an LED color to emit via LED 613, user interface device 610 can determine the health of the associated industrial device based on performance metrics 614. More specifically, user interface device 610 can determine the health of the associated industrial device by performing one or more operations on performance metrics 614, such as by using contextualization information and rule sets, to categorize performance metrics 614 into healthy, unhealthy, or approaching unhealthy classifications. In various examples, user interface device 610 can invert the contrast of background 612, or a portion of background 612, if one or more of performance metrics 614 indicate unhealthy behavior. Further, user interface device 610 can change colors of LED 613 if one or more of performance metrics 614 indicate unhealthy or approaching unhealthy behavior. It follows that in aspect 601, user interface device 610 may determine that performance metrics 614-1 indicates unhealthy behavior, but that overall, the conveyer belt drive may be operating in a healthy manner, despite performance metrics 614-1 being unhealthy, so LED 613 emits a green light.

FIG. 6B includes aspect 602, which also illustrates user interface device 610 and user interface 611. Importantly, however, user interface device 610 shown in aspect 602 includes LED 613 that emits a red light.

In this example, user interface device 610 may determine that performance metrics 614-1 indicates unhealthy behavior. Accordingly, user interface device 610 can use an inverted contrast, with respect to the default contrast, for background 612 of user interface 611 where performance metrics 614-1 is displayed. Additionally, user interface device 610 may determine, based on performance metrics 614-1, 614-2, and 614-3, that the overall health of the conveyer belt drive is unhealthy. This may entail comparing each of performance metrics 614-1, 614-2, and 614-3, individually and in combination, to one or more thresholds. In response to determining that the overall health is unhealthy, user interface device 610 can emit a red light from LED 613.

Various combinations or variations of colors and contrasts may be contemplated to provide visual indications using user interface device 610. In some cases, the colors and contrasts may be tied to rule sets or other threshold values, each of which can be configured by a user. Advantageously, the contrast of background 612 and the color of LED 613 can be selectively changed to provide visual indications to users in an industrial automation environment as to the health of connected industrial device(s).

Figure 7A:
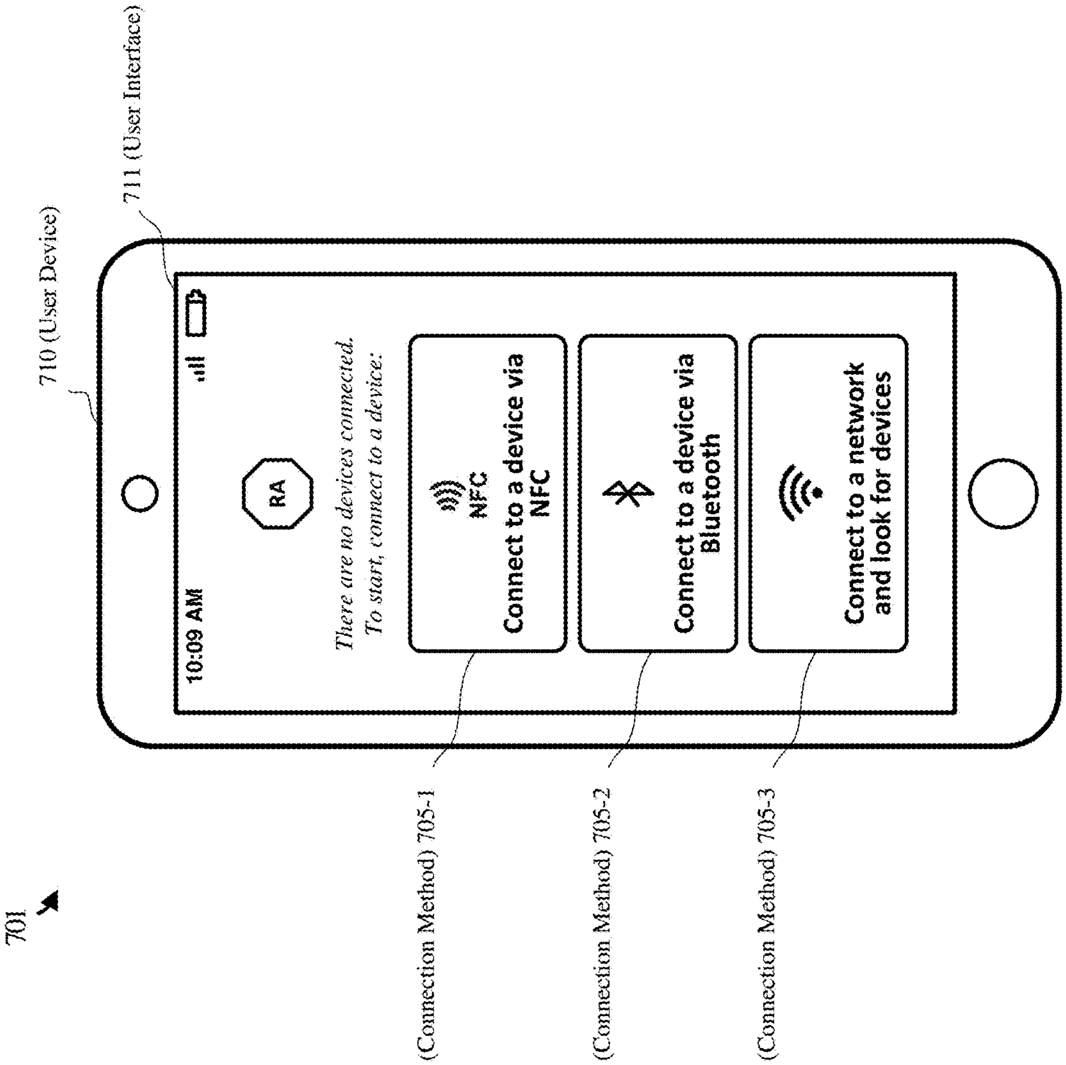
FIGS. 7A, 7B, and 7C illustrate example representations of user interfaces including device health metrics of industrial automation devices in accordance with some embodiments of the present technology.
Figure 7B:
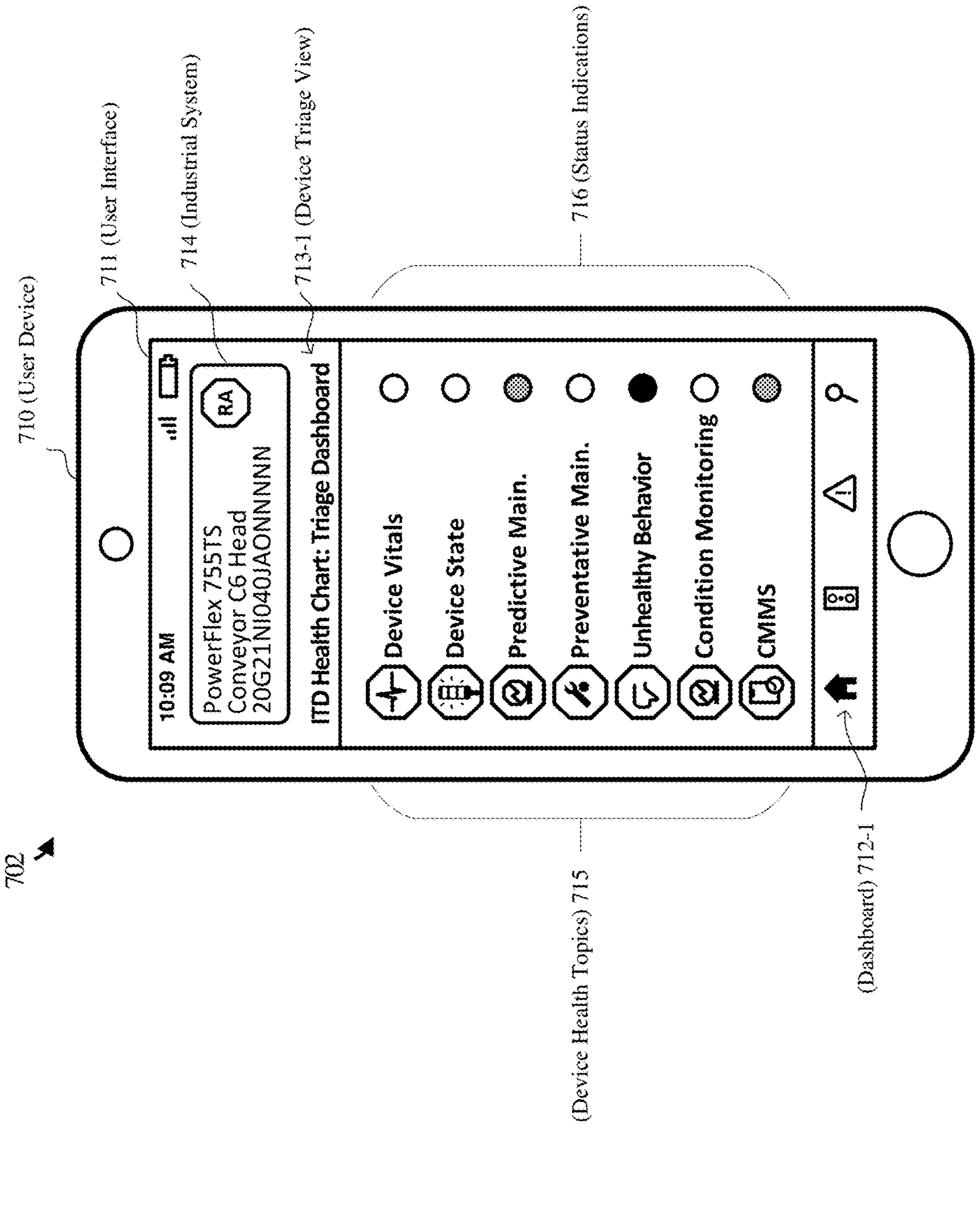
Figure 7C:
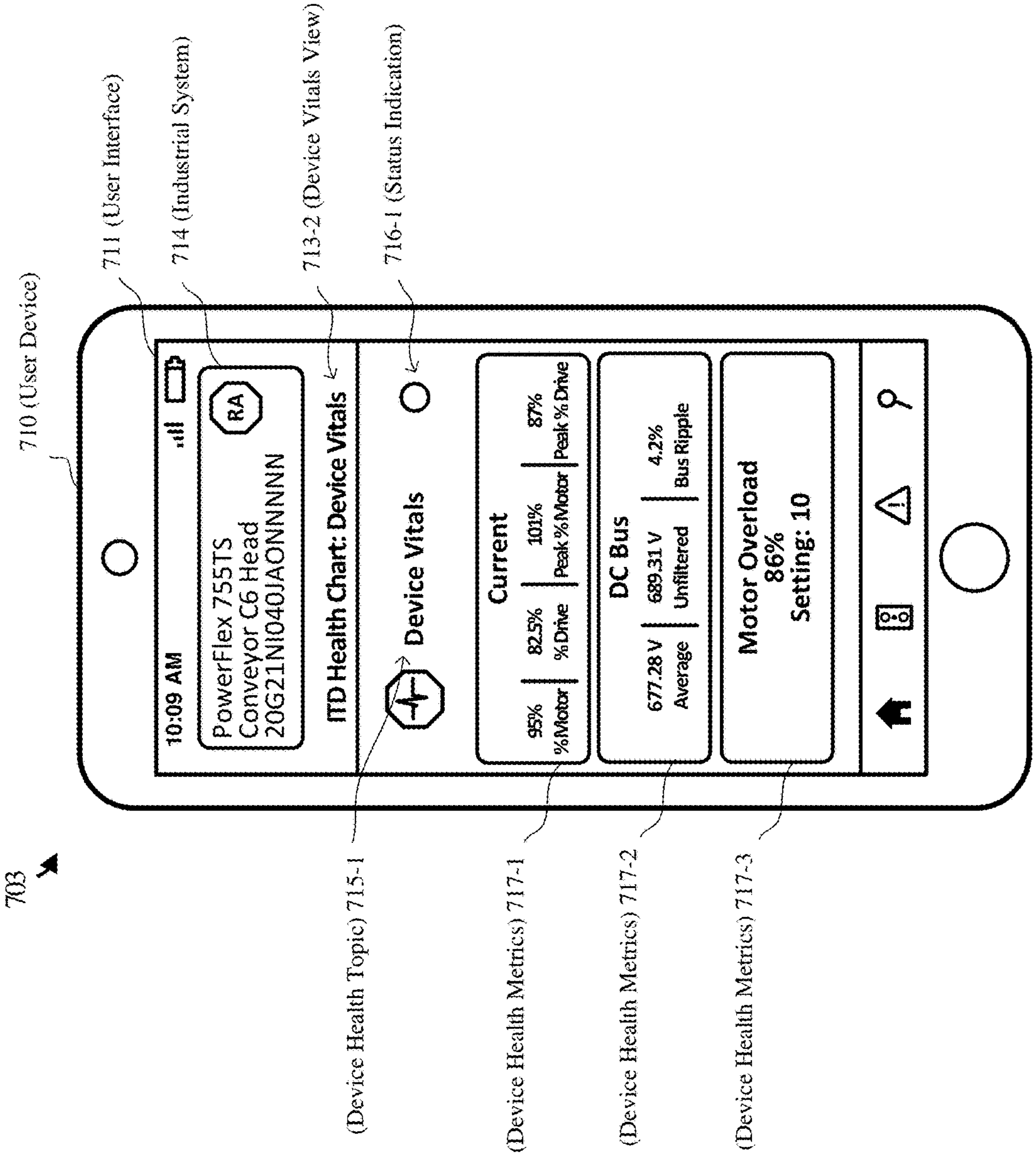

FIGS. 7A, 7B, and 7C illustrate example representations of user interfaces including device health metrics of industrial automation devices in accordance with some embodiments of the present technology. FIGS. 7A, 7B, and 7C each demonstrate an aspect of a user experience for configuring and viewing device health information corresponding to one or more industrial devices in an industrial automation environment on user interface 711 of user device 710. In various examples, a user can navigate between the aspects and views of user interface 711 shown in FIGS. 7A, 7B, and 7C interacting with user interface 711 (e.g., tap, swipe, click). User device 710 may exemplify user device 111 of operating environment 100 of FIG. 1. The device health information displayed on user interface 711 of user device 710 may be provided by a server, such as server 115 of FIG. 1, server 201 of FIG. 2, or server 302 of FIG. 3, among other components of an industrial automation environment.

FIG. 7A includes aspect 701, which illustrates user device 710 and a connectivity view displayed on user interface 711 of user device 710. User device 710 is representative of a handheld device, such as a smart phone or tablet, having a touchscreen that can be used to both display information on user interface 711 and provide for interaction to connect to one or more devices in an industrial automation environment, such as an industrial device or a controller coupled to the industrial device.

User interface 711 may display an instance of the device health application that may run on user device 710. The instance displayed on user interface 711 may include a setup or configuration window, which may allow access to one or more navigable dashboards having information about the industrial devices and related performance and health data once a connection is established with the industrial devices. For example, the connectivity view of aspect 701 may show connection methods 705-1, 705-2, and 705-3 for establishing such a connection with an industrial device.

Connection method 705-1 includes a first connection process to connect user device 710 to an industrial device via an NFC protocol. Connection method 705-1 may be accomplished by selecting, clicking, tapping, or otherwise interacting with connection method 705-1 on user interface 711 when user device 710 is in close proximity to the industrial device. In some cases, user device 710 and the industrial device may have to be physically touching, or nearly physically touching, to establish a connection using NFC.

Connection method 705-2 includes a second connection process to connect user device 710 to an industrial device via Bluetooth. Connection method 705-2 may be initiated by selecting, clicking, tapping, or otherwise interacting with connection method 705-2 on user interface 711. In various examples, connection method 705-2 includes putting user device 710 into a Bluetooth pairing mode where user device 710 can search for or be found by the industrial device to establish a wireless connection. User device 710 may need to be in close proximity to the industrial device, but any distance between user device 710 and the industrial device according to Bluetooth protocols may be used.

Connection method 705-3 includes a third connection process to connect user device 710 to an industrial device via a communication network, such as through Wi-Fi. Connection method 705-3 may entail selecting, clicking, tapping, or otherwise interacting with connection method 705-3 on user interface 711 to view available communication networks and available industrial devices on the available communication networks. In order to use connection method 705-3, user device 710 may need to have access to a communication network that an industrial device is connected to.

Following connection to one or more industrial devices using one or more of connection method 705-1, 705-2, or 705-3, user device 710 can obtain data from the one or more industrial devices to populate user interface 711 with indications of the data. Additional details of the indications are discussed with respect to aspects 702 and 703 of FIGS. 7B and 7C, respectively.

FIG. 7B includes aspect 702, which illustrates user device 710 and a dashboard 712-1 displayed on user interface 711 of user device 710. Dashboard 712-1 may show industrial system 714, a device triage view 713-1, device health topics 715, and status indications 716.

Industrial system 714 may indicate which industrial device or industrial system user interface 711 is displaying information about. In some cases, user device 710 may be connected to one or more devices of industrial system 714 or a controller coupled to devices of industrial system 714. In this example, industrial system 714 indicates that the system is named "PowerFlex 755TS Conveyor C6 Head," which may include various devices, components, and equipment that can perform an industrial or commercial process.

Device triage view 713-1 refers to a name of a page or view on dashboard 712-1 that can be displayed on user interface 711. In aspect 702, device triage view 713-1 may include device health topics 715 and corresponding status indications 716. Device health topics 715 include various device health or condition related topics, such as device vitals, device state, predictive maintenance, preventative maintenance, unhealthy behavior, condition monitoring, and CMMS (Computerized Maintenance Management System). Conditioning monitoring may include software that receives data from smart devices and performs motor current signature analysis and inform potential problems such as motor bearings issues and pump cavitation, for example. CMMS may include software that helps manage assets, schedule maintenance, and track work orders, for example. Status indications 716 may indicate a healthy status, an unhealthy status, or an approaching unhealthy status.

In use, user device 710 can connect to a server and one or more industrial devices in an industrial automation environment via a wireless connection (e.g., Bluetooth, Wi-Fi, NFC) established in a connectivity view illustrated in aspect 701. In some cases, user device 710 can connect directly to an industrial device. In other cases, user device 710 may connect to a controller (e.g., a PLC) coupled to the industrial device. Regardless, user device 710 can request information related to performance and health of the industrial devices from the server and the industrial devices. The server can receive the request, obtain performance metrics from the selected industrial devices, and perform device health processes, such as processes described above in FIGS. 2 and 3, and provide indications of health and performance metrics for display on user interface 711.

Referring next to FIG. 7C, FIG. 7C includes aspect 703, which illustrates device vitals view 713-2 on user interface 711 of user device 710. Device vitals view 713-2 may include contextualized performance metrics of industrial system 714, or devices associated with industrial system 714, related to device health topic 715-1, device vitals. In this example, device vitals view 713-2 includes device health metrics 717-1, device health metrics 717-2, and device health metrics 717-3.

Device health metrics 717-1 includes contextualized performance metrics derived from current outputs of industrial system 714. More specifically, device health metrics 717-1 includes a motor speed percentage, (95%), a drive usage percentage (82.5%), a peak motor speed percentage (101%), and a peak drive usage percentage (87%). These values may indicate whether industrial system 714, or more particularly the motor and drive of industrial system 714, are operating below, at, or above a capacity.

Device health metrics 717-2 includes contextualized performance metrics derived from voltage outputs of industrial system 714. More specifically, device health metrics 717-2 includes average DC bus voltage (677.28 V), unfiltered DC bus voltage (689.31 V), and DC bus ripple (4.2%). These values may indicate whether a DC bus of industrial system 714 is outputting too much, too little, or a normal voltage to other devices in industrial system 714.

Device health metrics 717-3 includes contextualized performance metrics derived from motor outputs of industrial system 714. More specifically, device health metrics 717-3 includes a motor overload value (86%) and a motor setting (10). These values may indicate whether the motor of industrial system 714 is overloaded or operating normally.

In various examples, a server can determine device health metrics 717-1, 717-2, and 717-3 by contextualizing performance metrics of industrial system 714. Performance metrics may include raw outputs or signals obtained from industrial system 714, such as output current, output voltage, and motor speed, among other signals. The server can contextualize device health metrics 717-1, 717-2, and 717-3 by using contextualization information specific to a metric of device health metrics 717-1, 717-2, and 717-3 and performing one or more operations on the metrics. Contextualization information may refer to information indicative of a type of a value (e.g., voltage, temperature, current, speed) or unit of measurement of a value (e.g., volts, degrees Fahrenheit, amps, RPM). By way of example, to determine the motor speed percentage of device health metrics 717-1, the server may perform one or more operations using the output current of a motor of industrial system 714, such as an operation to convert the output value current from amps to a percentage based on the total capable motor speed. By way of another example, to determine the peak motor speed percentage of device health metrics 717-1, the server may perform one or more different operations using the output current of the motor of industrial system 714. Thus, the server can perform any combination or variation of operations based on desired output metrics in device health metrics 717-1, 717-2, and 717-3 for display in device vitals view 713-2.

The server may account for device health metrics 717-1, 717-2, and 717-3, among other metrics, to determine status indication 716-1. For example, the server can apply one or more rule sets to device health metrics 717-1, 717-2, and 717-3 to determine whether any values within device health metrics 717-1, 717-2, and 717-3 exceed unhealthy threshold values. In cases where device health metrics 717-1, 717-2, and 717-3 include values that do not exceed threshold values, status indication 716-1 can indicate that device health topic 715-1 includes healthy metrics.

Figure 8:
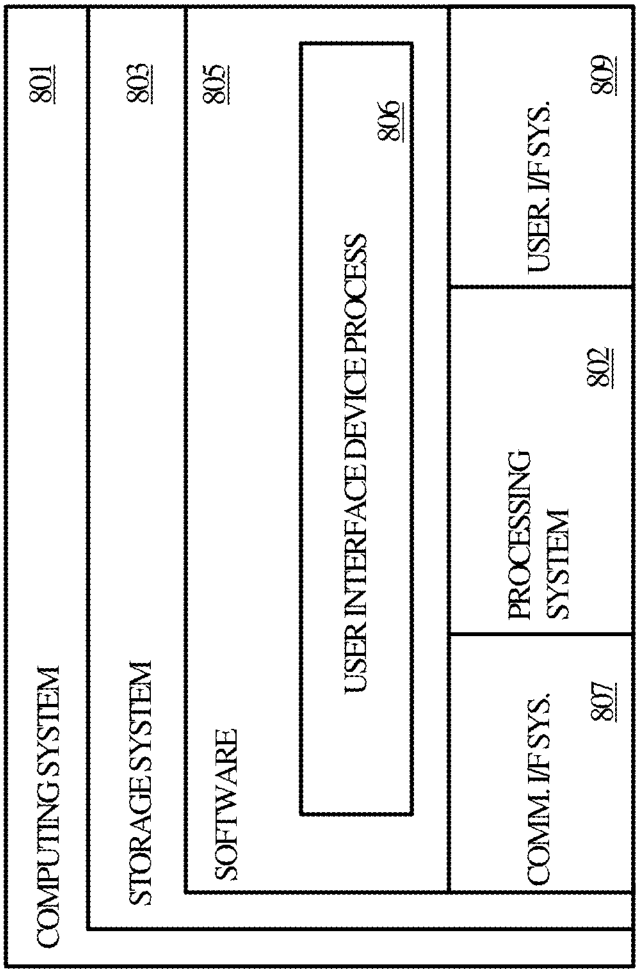
FIG. 8 illustrates an example computing system used in some embodiments of the present technology.

FIG. 8 illustrates computing system 801 to perform device health metric contextualization and classification and instantiation of device health metrics on a user interface according to an implementation of the present technology. Computing system 801 is representative of any system or collection of systems with which the various operational architectures, processes, scenarios, and sequences disclosed herein for device health collection, configuration, and instantiation may be employed. Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809. Computing system 801 may be representative of a cloud computing device, distributed computing device, or the like.

Processing system 802 loads and executes software 805 from storage system 803. Software 805 includes and implements user interface device process 806, which is representative of any of the performance metrics gathering, contextualization, categorization, and classification processes discussed with respect to the preceding Figures. When executed by processing system 802 to provide device health metrics functions, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 6, processing system 802 may comprise a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller capable of communicating with processing system 802 or possibly other systems.

Software 805 (including user interface device process 806) may be implemented in program instructions and among other functions may, when executed by processing system 802, direct processing system 802 to operate as described with respect to the various operational scenarios, sequences, and processes illustrated herein. For example, software 805 may include program instructions for implementing a device health metrics process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide device health metrics and contextualization and instantiation thereof as described herein. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system, comprising:

a controller coupled to an industrial device in an industrial automation environment and comprising:

one or more controller processors;

a controller memory coupled to the one or more controller processors and having controller program instructions stored thereon that, based on being read and executed by the one or more controller processors, direct the one or more controller processors to:

obtain device health metrics and device health metrics categories associated with the industrial device, wherein the device health metrics comprise contextualized performance metrics associated with the industrial device, and wherein the device health metrics categories comprise categorizations of a health of the industrial device based on one or more of the device health metrics; and a user interface device coupled to the controller and comprising:

a user interface;

one or more device processors; and a device memory coupled to the one or more device processors and having device program instructions stored thereon that, based on being read and executed by the one or more device processors, direct the one or more device processors to:

receive the device health metrics and the device health metrics categories associated with the industrial device from the controller;

display, via the user interface, first indications corresponding to the device health metrics and second indications corresponding to the device health metrics categories; and control a light-emitting diode (LED) of the user interface device to emit one of two or more colors based on the device health metrics categories to indicate the health of the industrial device, wherein to control the LED, the program instructions direct the one or more device processors to control the LED to:

emit a first color of the two or more colors based on the device health metrics categories indicating the health of the industrial device is healthy, and emit a second color of the two or more colors based on the device health metrics categories indicating the health of the industrial device is approaching unhealthy.

2. The system of claim 1, wherein to obtain the device health metrics and the device health metrics categories, the controller program instructions further direct the one or more controller processors to receive the device health metrics and the device health metrics categories from a server, and wherein the system further comprises the server, wherein the server comprises:

one or more server processors; and a server memory coupled to the one or more server processors and having server program instructions stored thereon that, based on being read and executed by the one or more server processors, direct the one or more server processors to:

obtain performance metrics associated with the industrial device;

contextualize the performance metrics based on contextualization information specific to the performance metrics to produce the device health metrics;

classify the device health metrics into the device health metric categories based on applying rule sets to the device health metrics; and provide the device health metrics and the device health metrics categories to the controller.

3. The system of claim 1, wherein to obtain the device health metrics and the device health metrics categories, the controller program instructions further direct the one or more controller processors to:

obtain performance metrics associated with the industrial device;

contextualize the performance metrics based on contextualization information specific to the performance metrics to produce the device health metrics; and classify the device health metrics into the device health metric categories based on applying rule sets to the device health metrics.

4. The system of claim 3, wherein to contextualize the performance metrics, the controller program instructions further direct the one or more controller processors to perform one or more operations on the performance metrics.

5. The system of claim 3, wherein the rule sets comprise one or more of threshold data, a time range, and a quantity.

6. The system of claim 3, wherein the device health metrics categories comprise a healthy category, an unhealthy category, and an approaching unhealthy category.

7. The system of claim 1, wherein the display of the user interface device comprises text and a background having a default contrast with respect to the text, and wherein the device program instructions direct the one or more device processors to invert a contrast of at least a portion of the background based on the device health metrics categories.

8. The system of claim 1, wherein the device program instructions further direct the one or more device processors to map each of the device health metrics categories to a respective color of the two or more colors.

9. The system of claim 1, wherein the user interface device is coupled to one or more further controllers, each of the one or more further controllers coupled to one or more industrial devices in the industrial automation environment.

10. The system of claim 1, wherein the user interface device further comprises a communication interface, and wherein the device program instructions further direct the one or more device processors to establish, via the communication interface, a connection with a user device.

11. A system, comprising:

a controller coupled to an industrial device in an industrial automation environment and comprising:

one or more controller processors;

a controller memory coupled to the one or more controller processors and having controller program instructions stored thereon that, based on being read and executed by the one or more controller processors, direct the one or more controller processors to:

obtain device health metrics and device health metrics categories associated with the industrial device, wherein the device health metrics comprise contextualized performance metrics associated with the industrial device, and wherein the device health metrics categories comprise categorizations of a health of the industrial device based on one or more of the device health metrics; and a user interface device coupled to the controller and comprising:

a communication interface;

one or more device processors; and a device memory coupled to the one or more device processors and having device program instructions stored thereon that, based on being read and executed by the one or more device processors, direct the one or more device processors to:

receive a request to establish a wireless connection to a user device;

establish, via the communication interface, the wireless connection with the user device based on the request;

provide, via the wireless connection, first indications corresponding to the device health metrics and second indications corresponding to the device health metrics categories to the user device; and control a light-emitting diode (LED) of the user interface device to emit one of two or more colors based on the device health metrics categories to indicate the health of the industrial device, wherein to control the LED, the program instructions direct the one or more device processors to:

emit a first color of the two or more colors based on the device health metrics categories indicating the health of the industrial device is healthy, and emit a second color of the two or more colors based on the device health metrics categories indicating the health of the industrial device is approaching unhealthy.

12. The system of claim 11, wherein to obtain the device health metrics and the device health metrics categories, the controller program instructions further direct the one or more controller processors to receive the device health metrics and the device health metrics categories from a server, and wherein the system further comprises the server, wherein the server comprises:

one or more server processors; and a server memory coupled to the one or more server processors and having server program instructions stored thereon that, based on being read and executed by the one or more server processors, direct the one or more server processors to:

obtain performance metrics associated with the industrial device;

contextualize the performance metrics based on contextualization information specific to the performance metrics to produce the device health metrics;

classify the device health metrics into the device health metric categories based on applying rule sets to the device health metrics; and provide the device health metrics and the device health metrics categories to the controller.

13. The system of claim 12, wherein to contextualize the performance metrics, the server program instructions direct the one or more server processors to perform one or more operations on the performance metrics.

14. The system of claim 12, wherein the rule sets comprise one or more of threshold data, a time range, and a quantity.

15. The system of claim 11, wherein the device health metrics categories comprise a healthy category, an unhealthy category, and an approaching unhealthy category.

16. The system of claim 11, wherein the device program instructions direct the one or more device processors to establish the wireless connection using one of a near-field communication protocol, Bluetooth, and Wi-Fi.

17. The system of claim 11, wherein the user interface device further comprises a user interface capable of displaying the first indications and the second indications and a display including text and a background having a default contrast with respect to the text, and wherein the device program instructions direct the one or more device processors to invert a contrast of at least a portion of the background based on the device health metrics categories.

18. The system of claim 17, wherein the device program instructions further direct the one or more device processors to map each of the device health metrics categories to a respective color of the two or more colors.

19. The system of claim 11, wherein the user interface device is coupled to one or more further controllers, each of the one or more further controllers coupled to one or more industrial devices in the industrial automation environment.

20. A user interface device, comprising:

a user interface;

one or more device processors; and a device memory coupled to the one or more device processors and having device program instructions stored thereon that, based on being read and executed by the one or more device processors, direct the one or more device processors to:

obtain device health metrics and device health metrics categories associated with an industrial device from a controller, wherein the device health metrics comprise contextualized performance metrics associated with the industrial device, and wherein the device health metrics categories comprise categorizations of a health of the industrial device based on one or more of the device health metrics;

display, via the user interface, first indications corresponding to the device health metrics and second indications corresponding to the device health metrics categories; and control a light-emitting diode (LED) of the user interface device to emit one or two or more colors based on the device health metrics categories to indicate the health of the industrial device, wherein to control the LED, the program instructions direct the one or more device processors to control the LED to:

emit a first color of the two or more colors based on the device health metrics categories indicating the health of the industrial device is healthy, and emit a second color of the two or more colors based on the device health metrics categories indicating the health of the industrial device is approaching unhealthy.

* * * * *